Figure 1:
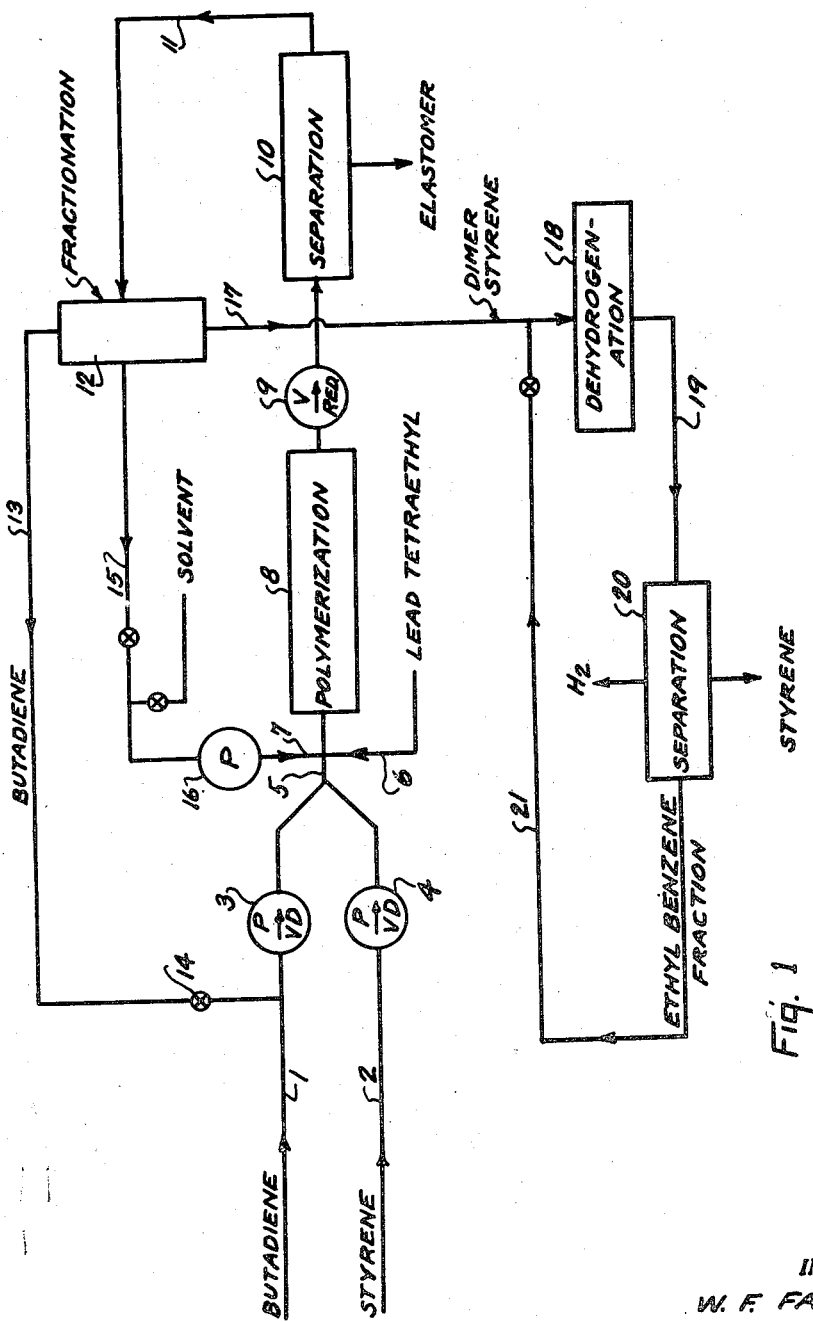

Patented Apr. 4, 1950

2,502,444

UNITED STATES PATENT OFFICE 2,502,444

PRODUCTION OF HIGH MOLECULAR WEIGHT ELASTIC HYDROCARBON POLYMERS IN THE PRESENCE OF LEAD TETRAETHYL

Warren F. Faragher, Swarthmore, Pa., assignor to Houdry Process Corporation, Wilmington, Del., a corporation of Delaware Application March 12, 1945, Serial No. 582,358

2 Claims. (Cl. 260—84.1)

The present invention relates to new and improved methods or the production of polymers of highly unsaturated hydrocarbons.

High molecular weight polymers of certain unsaturated hydrocarbons have considerable importance as synthetic elastomers and may be substituted for natural rubber. Reactions producing high molecular weight elastic polymers have been extensively studied and various combinations of raw materials and catalyst have been suggested. Frequently, the products are of inferior quality and cannot be used as tread stock for tires. The by-products of these reactions are often heavy oils which contaminate the rubber. Such heavy oils are difficult to separate from the rubber polymer and an inferior product results.

An object of this invention is the production of high quality synthetic elastomers. Another object of this invention is to furnish a process for the production of synthetic rubber wherein the raw materials are used in an efficient manner. Still another object of this invention is to provide a process for the production of synthetic rubber copolymerized from a conjugated diolefin and an aryl alkene in which the only raw material necessary is the conjugated diolefin.

In accordance with my invention, I polymerize a conjugated diolefin such as butadiene in the presence of lead tetraethyl. As is well known, the quality of the synthetic elastomer is improved when the conjugated diolefin is copolymerized with an aryl alkene such as styrene. I have found, over a wide range of polymerization conditions, that such copolymers exhibit superior characteristics in regard to stress-strain, milling, and heat resistance, when lead tetraethyl is added to the reactants. Copolymer made in the presence of lead tetraethyl met the government specifications for tread stock. A valuable dimer, 4-ethenyl-cyclohexene, was also produced. This by-product may be dehydrogenated to styrene and used in the copolymerization. The process thus can be operated independently of any raw material other than butadiene. The process is applicable to homologues of butadiene and styrene. Conjugated diolefins such as isoprene, 2,3-dimethylbutadiene, or 2-methylpentadiene-1,3 may be substituted for the butadiene. A-methyl styrene or similar aryl alkenes copolymerizable with butadienes may be used instead of styrene.

Various methods known in the art of polymerization are applicable to the present invention. The type known as mass polymerization is preferred and the reaction is preferably conducted in an aromatic solvent. In one phase of my invention, I use ethylbenzene both as a solvent and as a source of styrene to which it is dehydrogenated. The ethylbenzene used as a solvent may be separated from the reaction products together with the dimer of butadiene, 4-ethenyl-cyclohexene, and a fraction consisting of these two compounds can then be dehydrogenated to a mixture of styrene and ethylbenzene. The polymerization may be either a batch or a continuous operation.

Figure 1 is a flow sheet of a process in which butadiene and styrene are copolymerized in the presence of lead tetraethyl, and styrene is recovered from the dimer formed from the butadiene.

Figure 2:
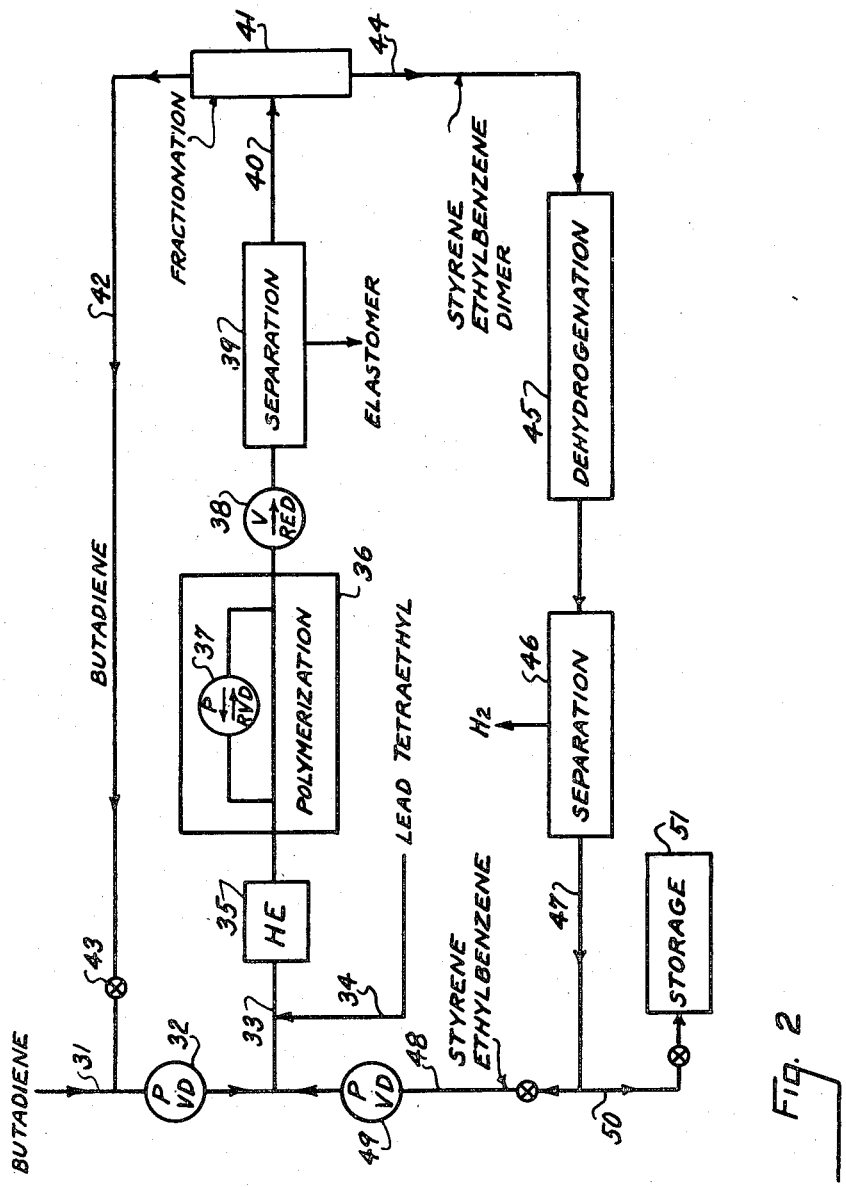

In Figure 2, the flow sheet illustrates a variation of the copolymerization of butadiene and styrene in the presence of lead tetraethyl in which styrene is recycled and in which ethylbenzene is used as an aromatic solvent for the polymerization process.

In Figure 1, butadiene (line 1) and styrene (line 2) are introduced into the system by variable delivery pumps 3 and 4. These pumps correctly proportion the amounts of the reactants in line 5. Lead tetraethyl is added to the reaction mixture through line 6 and an aromatic solvent through line 7. In polymerization zone 8, the reactants are polymerized at the desired temperature and pressure, and then pass through a pressure reducing valve 9 to a separation zone 10. In zone 10, the volatile constituents are separated from the elastomer produced in zone 8. Various methods may be employed to effect this separation such as flashing or steam distilling off the volatile constituents, or precipitating the high molecular weight polymer with a liquid such as alcohol or acetone. The separation zone, furthermore, may consist of two units which are used alternately, the elastomer being removed from one while it is being separated from the volatile constituents in the other. The volatile constituents from separation zone 10 pass, by line 11, to a fractionating zone 12 which consists of appropriate distillation equipment. Unreacted butadiene is taken off as an overhead fraction and returns by line 13 through valve 14 to line 1 where it is mixed with the fresh feed. The solvent leaves the fractionating zone by line 15 and is charged by pump 16 to the unpolymerized reactants. Unreacted styrene and dimer formed during the polymerization leave the fractionating zone 12 by line 17 and pass thereafter to dehydrogenation zone 18. The dehydrogenation zone 18 consists of one or more catalytic converters in which dimer is dehydrogenated to a mixture of styrene and ethylbenzene by methods known to the art. The dimer and styrene may be separated previous to the passage through the dehydrogenation zone and only dimer subjected to dehydrogenation. The products of dehydrogenation pass by line 19 to a separation zone 20 where hydrogen is removed from the liquid products. In this zone, styrene is separated by conventional methods from any ethylbenzene resulting from the incomplete conversion of the dimer to styrene. The separated ethylbenzene is returned by line 21 to the material entering the dehydrogenation zone and thereby furnishes additional styrene. The styrene produced by the above process may be added to the fresh feed or, if the amount formed is in excess of that needed for copolymerization, may be used in other polymerization processes to form valuable plastics such as polystyrene.

In the process illustrated in Figure 1, a relatively low boiling solvent is used. However, higher boiling solvents may be employed and the fractionating operation in zone 12 modified accordingly. The use of an organic solvent tends to prevent disposition of polymers within the equipment by increasing the rate of flow of the reaction mixture and by acting as solvent for the polymer. Useful solvents include hydrocarbons of 3 to 12 carbon atoms or higher. Preferably, toluene, ethylbenzene, xylene, cumene, tetraethyl benzene and the like are employed. Distillates from by-product coke ovens and from the cracking of petroleum may be used. Generally such fractions as are aromatic in nature are preferred. The amount of the solvent is not critical but is conditioned by efficient engineering practice in regard to the bulk of the material handled, the cost of the solvents, etc.

In Figure 2, butadiene (line 31) is introduced by a variable delivery pump 32 to line 33 where it is mixed with styrene and ethylbenzene previously formed in the process. A solution of lead tetraethyl is added to the reactants in line 33 through line 34 and the entire reaction mixture passes through a heat exchanger 35 to polymerization zone 36. The reactants are agitated in the polymerization zone by means of a reciprocating valveless pump 37. The opposite ends of pump 37 are connected to the opposite ends of the reaction zone and, when the piston of this pump reciprocates, the liquid in the reaction zone is alternately withdrawn and recharged at each end. This operation effects excellent mixing and agitation. A description of this pump and its mode of operation is given more fully in my joint application with J. W. Harrison, Ser. No. 509,430 filed November 8, 1943 and now abandoned. By means of pump 37 the desired agitation can be maintained within the reaction zone without extending the length of the reaction zone excessively. The temperature and pressure in the polymerization zone 36 are controlled by conventional equipment. The reaction mixture, after polymerization, is discharged through a pressure reducing valve 38 into a separation zone 39 where separation of the elastomer occurs as described in connection with Figure 1. The volatile constituents from the separation zone 39 pass through line 40 to a fractionating zone 41 where the separation of the volatile constituents occurs as described in connection with Figure 1. Butadiene is removed as an overhead fraction through line 42 and thence passes through line 43 to the fresh feed of butadiene in line 31. Styrene, ethylbenzene, and butadiene dimer pass through line 44 to a dehydrogenation zone 45 where dehydrogenation of the dimer and ethylbenzene occur as described in Figure 1. The products of dehydrogenation are passed to a separation zone 46 in which hydrogen is removed from the mixture of styrene and ethylbenzene. The mixture of styrene and ethylbenzene may be conducted by line 48 to pump 49 and thence to the fresh feed of butadiene in line 1 or alternately may be stored in zone 51 to which it passes by line 50. The mixture of styrene and ethylbenzene may be further processed to yield styrene which may be used for additional polymerization processes.

The specific processes described above may be used in connection with any conjugated diolefin which forms a dimer susceptible to dehydrogenation to an aryl alkene. Thus isoprene may be used, in which event the dehydrogenated dimer will be a methyl substituted styrene. Conjugated diolefins may be obtained by dehydrogenating petroleum fractions or similar hydrocarbon material, in which case the products of dehydrogenation may be charged directly to the process without separation. After polymerization, unreacted material may be again dehydrogenated and recharged to the system.

The conditions of temperature and pressure employed in the polymerization process are not critical. It is preferred to use such a pressure that liquid phase or mixed phase conditions will result. Increased conversion results when the temperature is raised, but the formation of dimer is also somewhat increased. The selection of a polymerization temperature will be governed by the needs of the particular operation, but it is preferred that the polymerization temperature be within the range of 70 to 400° F.

Tests of the physical properties of the rubber produced in the following examples were made using polymers compounded according to W. P. B. specifications for GR-S (India Rubber World, January, 375, 1944) and were vulcanized 50 minutes at 45 pounds per square inch (292° F.).

Example I

A mixture of 37.5 parts by weight of butadiene, 12.5 parts of styrene, and 50 parts of benzene was prepared. To this mixture was added 1.0 part of lead tetraethyl. This mixture was passed through a tubular polymerization zone, the pressure being sufficient to liquefy the butadiene. The polymerization zone was provided with means for agitating the mixture and was held at a temperature of 300° F. The time contact was 240 minutes. The reaction mixture, on emergence from the polymerization zone, was first cooled and then throttled to atmospheric pressure. The resulting high molecular weight polymer was separated from the volatile constituents and tested with the following results:

|  | Polymerized with Lead Tetraethyl | Government Specifications [1] |
|---|---|---|
| Modulus, 300%, p. s. i. | 885 | between 800 and 1,200. |
| Tensile Strength, p. s. i. | 2,540 | 2,500 Minimum. |
| Elongation, per cent | 605 | 500 Minimum. |

[1] Rubber Reserve Company.

Example II

The mixture of hydrocarbons, solvent, and lead tetraethyl used in Example I was subjected to polymerization under pressure at 375° F. for 20 minutes. The rubber thus produced had, after curing, a modulus at 300% of 640 p. s. i., tensile strength of 2900 p. s. i. and an elongation of 775%.

Example III 50 parts by weight of butadiene, 16.7 parts of styrene and 33.3 parts of benzene were combined with 1.0 part of lead tetraethyl and polymerized at 375° F. for 30 minutes. An identical hydrocarbon mixture was polymerized under the same reaction conditions in the absence of lead tetraethyl. The rubbers produced from these two runs were compared after curing. The rubber produced by the polymerization in the presence of tetraethyl lead had 29% higher modulus and 23% higher tensile strength than the rubber produced without the benefit of the lead tetraethyl. Furthermore, the percent conversion to high molecular weight elastomers was greater in the case of the reaction conducted in the presence of lead tetraethyl. The volatile constituents from both polymerizations were examined and, in both cases, a compound was isolated whose boiling point and other physical properties correspond to the values for the dimer of the butadiene, 4-ethenylcyclohexene. The structure of this compound was confirmed by the formation of its tetrabromide.

Example IV

A mixture of 100 parts by weight of butadiene and 100 parts of benzene were placed in a stainless steel autoclave provided with a stirring mechanism. To this mixture was added one part of tetraethyl lead. The contents of the autoclave were polymerized at 350° for 80 minutes. Analysis of the products showed a 57% conversion to high molecular weight polymers.

Example V

Various experiments were performed in which pure tetraethyl lead was used instead of the commercial preparation which contains ethylene dibromide. No significant difference in results was observed.

I claim as my invention:

1. In a process for the copolymerization of a conjugated diolefin selected from the group consisting of conjugated diolefins having from four to six carbon atoms inclusive with an aryl alkene selected from the group consisting of styrene and methyl substituted styrenes to form a high molecular weight elastic hydrocarbon copolymer of said conjugated diolefin and said aryl alkene, the improvement which comprises conducting said copolymerization in the presence of lead tetraethyl under liquid phase conditions to form a polymer containing mixture, and separating from said mixture said high molecular weight elastic hydrocarbon copolymer of said conjugated diolefin and said aryl alkene.

2. In a process for the copolymerization of butadiene and styrene to form a high molecular weight elastic hydrocarbon copolymer of butadiene and styrene, the improvement which comprises performing said copolymerization under liquid phase conditions in solution in an aromatic hydrocarbon and in the presence of lead tetraethyl at temperatures in the range of 70° to 400° F. to form a polymer containing mixture, and separating from said mixture said high molecular weight elastic hydrocarbon copolymer of butadiene and styrene.

WARREN F. FARAGHER.

REFERENCES CITED

The following references are of record in the file of this patent:

UNITED STATES PATENTS

| Number | Name | Date |
|---|---|---|
| 2,117,022 | Cramer | May 10, 1938 |
| 2,160,935 | Wiley | June 6, 1939 |
| 2,160,939 | Reinhardt | June 6, 1939 |
| 2,215,379 | Sebrell | Sept. 17, 1940 |
| 2,376,208 | Tucker | May 15, 1945 |

FOREIGN PATENTS

| Number | Country | Date |
|---|---|---|
| 26,550 | Great Britain | of 1912 |

OTHER REFERENCES

Beeck: Jour. of Chemical Physics, vol. 9, pp. 480–483, June 1941.